United States Patent
Zhou et al.

(10) Patent No.: US 8,677,206 B2
(45) Date of Patent: Mar. 18, 2014

(54) METHOD FOR TRANSMITTING AND RECEIVING SIGNALLING INFORMATION

(71) Applicant: Thomson Licensing, Issy de Moulineaux (FR)

(72) Inventors: Wei Zhou, Beijing (CN); Li Zou, Shangai (CN)

(73) Assignee: Thomson Licensing, Issy les Moulineaux (FR)

( * ) Notice: Subject to any disclaimer, the term of this patent is extended or adjusted under 35 U.S.C. 154(b) by 0 days.

(21) Appl. No.: 13/947,949

(22) Filed: Jul. 22, 2013

(65) Prior Publication Data

US 2013/0305125 A1    Nov. 14, 2013

Related U.S. Application Data

(62) Division of application No. 12/998,418, filed as application No. PCT/EP2009/063538 on Oct. 16, 2009.

(30) Foreign Application Priority Data

Oct. 20, 2008    (EP) ..................... 08305702

(51) Int. Cl.
*H03M 13/00*    (2006.01)

(52) U.S. Cl.
USPC ................. 714/755; 714/776; 714/789

(58) Field of Classification Search
USPC ............. 370/509, 514, 410, 208, 330, 337;
713/171; 375/295; 714/752, 755, 776,
714/789; 455/560
See application file for complete search history.

(56) References Cited

U.S. PATENT DOCUMENTS

| | | | |
|---|---|---|---|
| 6,122,504 A * | 9/2000 | Niepel et al. | 455/422.1 |
| 6,138,037 A * | 10/2000 | Jaamies | 455/560 |
| 6,819,679 B1 | 11/2004 | Kerns et al. | |
| 8,009,685 B2 * | 8/2011 | Himmanen et al. | 370/410 |
| 8,085,818 B2 | 12/2011 | Kim et al. | |
| 8,208,499 B2 | 6/2012 | Sun et al. | |
| 8,248,910 B2 * | 8/2012 | Jokela et al. | 370/208 |
| 8,498,262 B2 * | 7/2013 | Vesma et al. | 370/330 |
| 2007/0150796 A1 | 6/2007 | Kim et al. | |

(Continued)

FOREIGN PATENT DOCUMENTS

| | | |
|---|---|---|
| CN | 1239616 | 12/1999 |
| CN | 1630281 | 6/2005 |

(Continued)

OTHER PUBLICATIONS

Anonymous: "Digital Radio Mondiale (DRM); System Specification", European Broadcasting Union, ETSI Standard, ETSI ES 201980, v2.1.1, Jun. 2004, pp. 1-183.

(Continued)

*Primary Examiner* — David Ton
(74) *Attorney, Agent, or Firm* — Robert D. Shedd; Jeffrey M. Navon

(57) ABSTRACT

A method for protecting signalling information in a frame to be transmitted to a receiver in a communication system, comprising: encoding frame signalling information of the frame to protect the frame signalling information; and encoding Forward Error Correction FEC block signalling information of FEC blocks in the frame by using Reed-Muller codes to protect the FEC block signaling information.

14 Claims, 3 Drawing Sheets

(56) References Cited

U.S. PATENT DOCUMENTS

| | | | |
|---|---|---|---|
| 2007/0258413 A1* | 11/2007 | Sebire | 370/337 |
| 2009/0063861 A1 | 3/2009 | Chu | |
| 2009/0196217 A1* | 8/2009 | Himmanen et al. | 370/328 |
| 2013/0064323 A1 | 3/2013 | Bhaskaran et al. | |

FOREIGN PATENT DOCUMENTS

| | | |
|---|---|---|
| EP | 0944199 | 9/1999 |
| EP | 1487146 | 12/2004 |
| EP | 1912357 | 4/2008 |
| JP | 2005260611 | 9/2005 |
| JP | 2007036105 | 2/2007 |
| JP | 2007515113 | 6/2007 |
| JP | 2008510423 | 4/2008 |
| WO | WO2005053208 | 6/2005 |
| WO | WO2006031070 | 3/2006 |

OTHER PUBLICATIONS

Anonymous: DVB Bluebook A122, "Frame Structure Channel Coding and Modulation for a Second Generation Digital Terrestrial Television Broadcasting System (DVB-T2)"; Online, Jun. 2008, pp. 50-69.

ETSI Sttandards, "Radio Broadcasting Systems; Digital Audio Broadcasting (DAB) to Mobile, Portable and Fixed Receivers", European Broadcasting Union, ETSI EN 300 401, v1.4.1 Jun. 2006, pp. 1-197.

Moon, "Error Correction Coding", John Wiley & Sons, Inc., New Jersey, 2005, pp. 235-405.

Anonymous: Digital Video Broadcasiing (DVB) User Guidelines for the Second Generatioin System for Broadcastng, Interactive Services, News Gathering and Other Broadband Satellite Applications (DVB-S2) Tech Report, ETSITR102376, v1.1.1, Feb. 2005, pp. 1-104.

ETSI, DVB. "Document A122, Frame structure channel coding and modulation for a second generation digital terrestrial television broadcasting system (DVB-T2)" (2008), pp. 1, 14-17, 28-33, 50-62, 69, 70.

Morello, A., et al. "DVB-S2: the second generation standard for satellite broad-band services." Proceedings of the IEEE 94.1 (2006): 210-227.

* cited by examiner

METHOD FOR TRANSMITTING AND RECEIVING SIGNALLING INFORMATION

This application is a divisional of co-pending U.S. application Ser. No. 12/998,418, filed Jun. 28, 2011, herein incorporated by reference.

FIELD OF THE INVENTION

The present invention relates in general to communication systems, and more particularly, to a method and apparatus for transmitting and receiving signalling data in a communication system.

BACKGROUND OF THE INVENTION

Signalling information transportation is very important to a communication system. If some of the signaling information is lost, it will have great impact on payload data demodulation. If the channel environment is noisy, the proper protection of signalling information is necessary. For example, DVB-T (Digital Video Broadcast-Terrestrial), DTMB (Digital Terrestrial Multimedia Broadcast, Chinese Terrestrial standard) and the latest DVB-T2 standard all define signaling protection.

Digital Video Broadcasting-Cable (DVB-C) is a first generation cable transmission system (e.g., see EN 300 429 V.1.2.1 (1998-04) Digital Video Broadcasting (DVB); Framing structure, channel coding and modulation for cable systems). However, migration to a second generation cable system, DVB-C2, is currently being studied for protecting the signalling information.

FIG. 1 is a schematic diagram showing a L1 (layer1) signaling structure used in a DVB-T2 OFDM frame. As shown in FIG. 1, the signaling information is split into three main sections: P1 signalling, L1 pre-signalling and L1 post-signalling. The P1 signalling is carried by P1 symbols, and used to indicate the transmission type and basic transmission parameters. The remaining signalling is carried out by P2 symbols, comprising L1 pre-signalling and L1 post-signalling. The L1 pre-signalling enables the reception and decoding of the L1 post-signalling, which in turn conveys parameters needed by the receiver to the access physical layer pipes. The L1 post-signalling is further split into two main parts: configurable and dynamic, and these may be followed by an optional extension field. The L1 post-signalling finishes with a CRC and padding (if necessary).

In order to protect the L1 signalling information of the OFDM frame in DVB-T2, a concatenation channel code was proposed for performing FEC (Forward Error Correction) encoding for the signaling information, with the inner code using punctured S2-LDPC codes and the outer code using shortened BCH codes. This protection scheme can reuse the codex used for the following data payload of the OFDM frame. From the above-mentioned description, it can be seen that signaling information is protected at the OFDM frame level in DVB-T2. In addition, for DTMB and DVB-T, signaling information is also protected at the OFDM frame level.

SUMMARY OF THE INVENTION

The invention concerns A method for protecting signalling information in a frame to be transmitted to a receiver in a communication system, comprising: encoding frame signalling information of the frame to protect the frame signalling information; and encoding Forward Error Correction FEC block signalling information of FEC blocks in the frame by using Reed-Muller codes to protect the FEC block signalling information.

The Reed Muller codes is selected to encode FEC block signaling information, so as to make it possible that the FEC block header be detected easily in the receiver, because the symmetry structure of RM codewords can help to distinguish this RM codewords from the data stream by using autocorrelation calculation.

The invention also concerns a transmitter for implementing the above method for protecting signalling information in a frame. The transmitter comprises a signalling generator for providing respective signalling information for each FEC data block of a frame; a FEC encoder for encoding the respective signalling information; and a frame builder for forming an encoded FEC block including encoded signalling information and a corresponding FEC data block.

According to an embodiment, the signalling information generator of the transmitter further provides signalling information for the frame; the FEC encoder further encodes the frame signalling information and the frame builder further form an encoded frame including the encoded frame signalling information and the encoded FEC block.

The invention also concerns a method for receiving signalling information in a frame from a transmitter in a communication system, comprising: receiving a encoded frame signalling information and encoded FEC block signalling information of the frame; and decoding the encoded signalling information so that a corresponding FEC data block is recovered, wherein the encoded FEC block signalling information is a Reed-Muller codes encoded FEC block signalling information.

The invention also concerns a receiver for implementing the above method for decoding an encoded frame. The receiver comprises a means for receiving respective encoded FEC block of the frame, including a FEC data block and encoded signalling information for the FEC data block; and a FEC decoder for decoding the respective encoded signalling information so that a corresponding FEC data block is recovered.

According to an embodiment, the means for receiving of the receiver further receives an encoded frame including an encoded frame signalling information, and the FEC decoder further decodes the encoded frame signalling information so that the frame is recovered.

BRIEF DESCRIPTION OF DRAWINGS

These and other aspects, features and advantages of the present invention will become apparent from the following description in connection with the accompanying drawings.

DETAIL DESCRIPTION OF PREFERRED EMBODIMENTS

A description will now be given with reference to the attached figures to illustrate many advantages/features of the present invention, according to various illustrative embodiments of the present invention.

For more information about Digital Video Broadcasting-Terrestrial (DVB-T), see ETSI EN 300 744 V1.4.1 (2001-01); Framing structure, channel coding and modulation for digital terrestrial television; for more information on Digital Video Broadcasting-Cable (DVB-C), see EN 300 429 V.1.2.1 (1998-04) Digital Video Broadcasting (DVB); Framing structure, channel coding and modulation for cable systems); for more information on Digital Video Broadcast-satellite (DVB-S2) system, see European Telecommunications Standards Institute (ETSI) Draft EN 302307, v.1.1.1, June 2004); for more information on the Chinese Digital Television System, see (GB) 20600-2006 (Digital Multimedia Broadcasting—Terrestrial/Handheld (DMB-T/H)). For more information on (MPEG)-2 Systems Standard (ISO/IEC 13818-1)). It should also be noted that the inventive concept may be implemented using conventional programming techniques, which, as such, will not be described herein. In this regard, the embodiments described herein may be implemented in the analogue or digital domains.

It is known that an OFDM frame includes multiple FEC (Forward error correction) data blocks for data symbols such as audio and/or video data to be transmitted. As noted earlier, the signalling structure in DVB-T2 is based at the frame level. Thus, all FEC blocks of the data symbols in one T2 frame must obey the same signalling parameters, such as code rate and modulation.

According to an embodiment of the invention, the signalling information of the FEC blocks is protected by FEC encoding, so it can support VCM (Variable coding and modulation). In that case the signaling information can change at the FEC level instead of the frame level.

Figure 2:
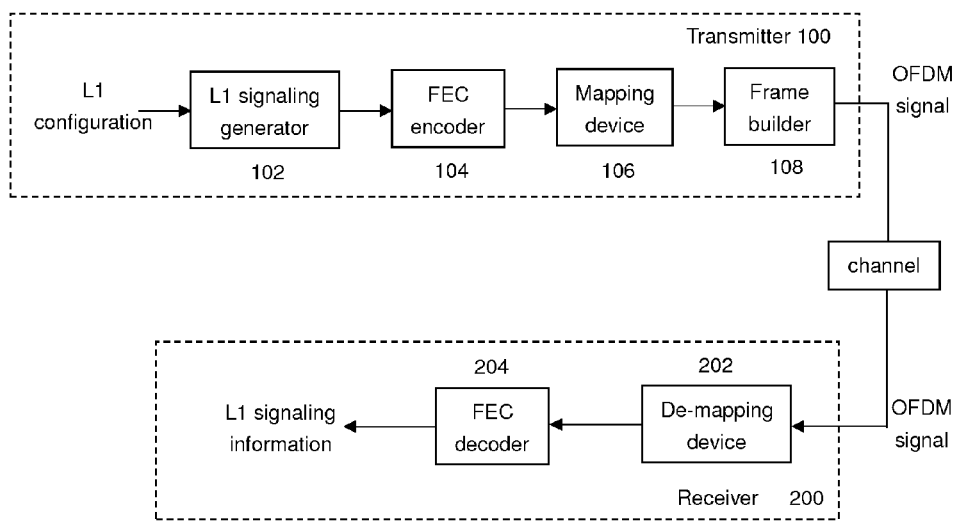
FIG. 2 is an illustrative block diagram showing a communication system comprising a transmitter and a receiver according to an embodiment of the invention.

Referring now to FIG. 2, an illustrative block diagram of a communication system according to the embodiment is shown comprising a transmitter 100 and a receiver 200. Only those portions relevant to the explanation of the embodiment of the invention are shown in transmitter 100 and receiver 200. In the communication system, the transmitter 100 transmits (or broadcasts) an OFDM signal with video and/or audio information and FEC encoded signaling information of the OFDM frame to the receiver 200 through a communication channel, as shown in FIG. 2.

Transmitter 100 comprises L1 signalling generator 102, FEC encoder 104, mapping device 106 and frame builder 108. Alternatively, transmitter 100 is a processor-based system and includes one or more processors and associated memory. In this context, computer programs, or software, are stored in the memory for execution by the processor, e.g., to implement FEC encoder 104. The processor is representative of one or more stored-program control processors and these do not have to be dedicated to the signalling information protection function, e.g., the processor may also control other functions of transmitter 100. The memory is representative of any storage device, e.g., random-access memory (RAM), read-only memory (ROM), etc.; may be internal and/or external to transmitter 100; and is volatile and/or non-volatile as necessary.

In transmitter 100, L1 signalling generator 102 is adapted to provide L1 signalling parameters, e.g., FFT size, the selected guard interval pilot pattern, coding rate and modulation scheme, for each transmitted frame to the receiver 200 according to the DVB transmission standard. The signalling parameters can change from frame to frame. How the signalling parameters are selected is irrelevant to the present embodiment and performed in accordance with the DVB standard. According to the embodiment, the L1 signalling generator 102 also provides signalling parameters such as code rate and modulation, for each FEC block of data symbols in the frame. The signalling parameters can also change from FEC block to FEC block, that is, Variable coding and modulation (VCM) is implemented.

FEC encoder 104 is adapted to encode the signalling parameters for each frame so as to form an encoded frame by frame builder 108 which will be described later, e.g., the frame is encoded by using concatenation codes to protect OFDM frame signaling. In addition, FEC encoder 104 is adapted to encode the respective signaling parameters for each FEC data block, e.g., by using Reed-Muller codes to protect the FEC signaling so as to form an encoded FEC block by frame builder 108, and the encoded FEC block includes the encoded signalling information and the corresponding FEC data block.

Figure 3:
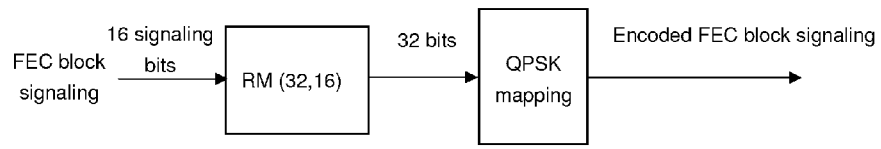
FIG. 3 is a block diagram of RM encoding for FEC signalling according to the embodiment of the invention.

Referring now to FIG. 3, a block diagram of the encoding scheme for FEC signaling by RM codes according to the present embodiment is shown. The RM codes used to encode the FEC signaling information can be first-order RM codes (32,6), (64,7), second-order RM codes (32,16), (64,22), sub-code of the second-order RM codes (32,10), or shortened RM codes (30,14). The final option depends on the FEC block signaling information bits number and the channel environment. In the embodiment as shown in FIG. 3, an RM code (32, 16) is used since the FEC block signalling information bits number is 16. A QPSK mapping process is performed on the encoded signalling data, so as to get an encoded FEC block.

Returning now to FIG. 2, transmitter 100 modulates the FEC encoded signaling using mapping device 106, and builds the encoded transmission frame including the encoded frame signalling information and the encoded FEC block in frame builder 108. The encoded transmission frames then are transmitted to receiver 200 through communication channel.

Receiver 200 comprises de-mapping device 202 and FEC decoder 204. Alternatively, like transmitter 100, receiver 200 is also a processor-based system and includes one or more processors and associated memory. In this context, computer programs, or software, are stored in the memory for execution by the processor, e.g., to implement FEC decoder 204. The processor is representative of one or more stored-program control processors and these do not have to be dedicated to the signalling information process function, e.g., the processor may also control other functions of receiver 200. The memory is representative of any storage device, e.g., random-access memory (RAM), read-only memory (ROM), etc.; may be internal and/or external to receiver 200; and is volatile and/or non-volatile as necessary.

In receiver 200, de-mapping device 202 is adapted to demodulate the encoded signalling information in the received OFDM signal after the encoded frame is split to data symbol and encoded signalling information, and FEC decoder 204 is adapted to decode the encoded signalling information, so that the OFDM frame is recovered based on the decoded signalling information. In particular, the FEC decoder 204 decodes each encoded frame to obtain its signalling parameter, e.g., FFT size, guard interval pilot pattern choosing, coding rate and modulation scheme. FEC decoder 204 also decodes the encoded signalling information in the encoded FEC block of the frame, by RM decoding, to obtain FEC block signalling parameters such as code rate and modulation, so that each FEC data block of the data symbols can be recovered based on the corresponding FEC block signalling parameters.

Figure 4:
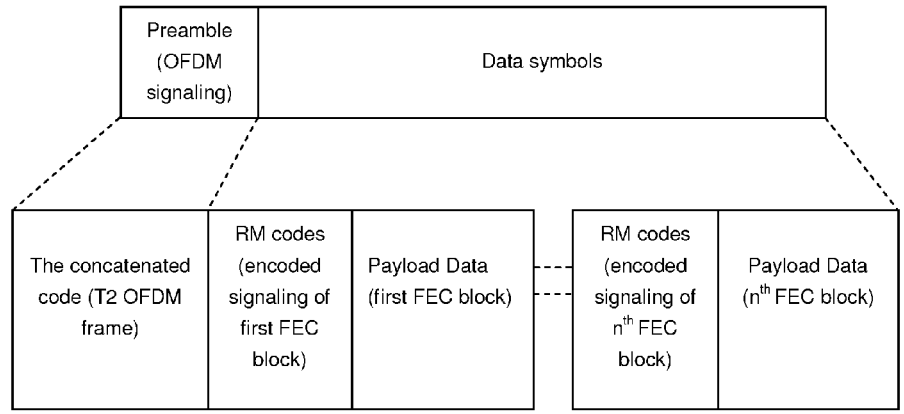
FIG. 4 is a schematic diagram showing a encoding scheme for a transmission frame according to the embodiment of the invention.

Referring now to FIG. 4, a schematic diagram of an encoding scheme for the transmission frame according to the embodiment is shown. In FIG. 4, the transmission frame includes a preamble for OFDM signalling and data symbols. As mentioned above, a concatenated code (BCH+S2-LDPC) is used to protect the OFDM signalling to form an encoded frame signalling. Alternatively, in order to decrease the overhead, the BCH codes can be further shortened and S2-LDPC can be further punctured based on the OFDM signaling information bits number requirement in the channel environment. Another embodiment is to use the shortened BCH (7032, 7200), and punctured DVB-S2 LDPC, which has a code rate of ½.

In addition, in FIG. 4, in order to protect FEC block signaling information, a Reed-Muller (RM) code is used to encode signalling information for each FEC data block, to form an encoded FEC block including FEC data block and encoded FEC block signalling information. The Reed-Muller code can support the majority logic decoder, so it requires a very short decoding time, which can speed up signaling information decoding process at the receiver. In addition, Reed-Muller codes also have excellent error-performance, which can help to protect the related signaling information.

In addition, the symmetry structure of RM codewords can help to distinguish this RM codewords from the data stream, so that the FEC block header can be detected easily in the receiver. For example, when RM code (32, 16) as shown in FIG. 3 is used to encode the FEC block signalling information, a RM codewords is obtained by a linear combination of a 16 rows of the RM generator matrix based on the FEC block signalling information. There exist 6 rows with symmetric structure in the generator matrix.

In the receiver, when the RM codewords are received, the RM autocorrelation result of the 6 rows with symmetric structure can be used to detect the FEC block header. For example, when the peak value of the autocorrelation reaches a predetermined threshold, the starting position of the autocorrelation is the starting position of the FEC block, that is, the FEC block header.

In another embodiment, a LDPC codes can also be used to encode the signalling information for each FEC data block. In order to use the LDPC codes flexibly, a short LDPC code obtained by shorten technique can be defined in finite geometry and can support multi-step majority logic decoding, such as (31, 16), (63, 22), (63,37), (255, 21), 255, 175). According to the above embodiment with a FEC block signalling information bits number 16, the LDPC code can be shorten to (42, 16).

Figure 5:
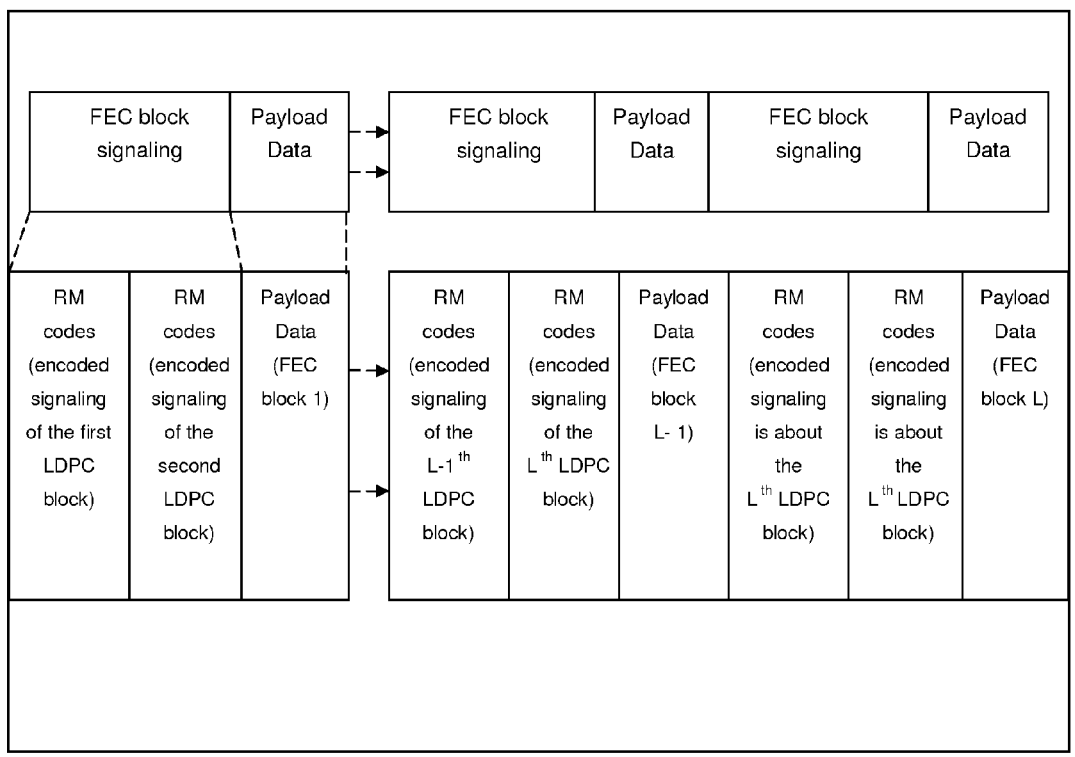
FIG. 5 is a schematic diagram showing another FEC encoding scheme according to another embodiment of the invention.

In a communication transmission environment, especially in cable transmission, how to overcome the influence of impulsive noise is an important issue. Referring now to FIG. 5, a schematic diagram of another FEC encoding scheme is shown according to another embodiment to overcome impulsive noise.

In the embodiment as shown in FIG. 5, the first encoded FEC block carries two RM codes, one is the encoded FEC block signalling for the first FEC data block, and other is the encoded FEC block signalling of the second FEC data block. Accordingly, the L-1th encoded FEC block carries the encoded FEC block signalling for both the L-1th FEC data block and the Lth FEC data block. For the final encoded FEC block of an OFDM frame, it carries the encoded FEC block signalling for both the Lth FEC data block and the L-1th FEC data block.

In the embodiment, a specific arrangement of the FEC block encoding scheme is described to implement a repetition signalling protection. However, other repetition signalling protection methods can also be used. For example, one RM module can include more than two RM codes, and if one RM code is be used for Lth FEC block signalling, the other can be used for the L+2th FEC block signalling or another selection based on requirements of the communication environment. In addition, other codes can also be used to encoding the signalling information of the FEC data block according to the requirement, so the RM code and LDPC code is just an embodiment of the invention, but not a limitation. According to the embodiment, the two RM codewords can be used to detect the FEC block header accurately because of two peak values are occurred in the autocorrelation result.

Figure 1:
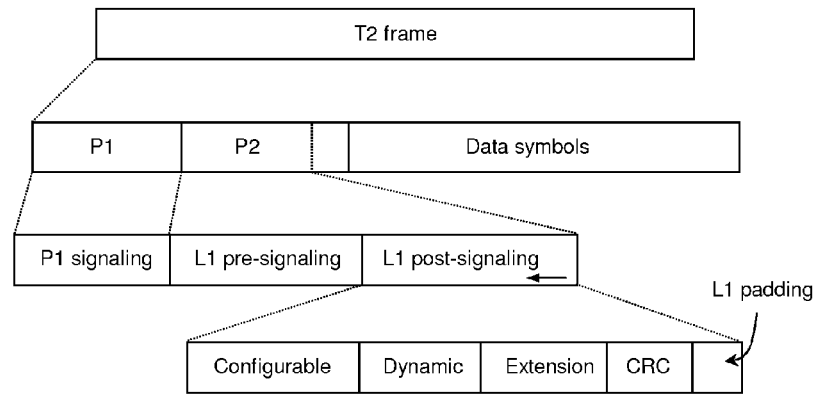
FIG. 1 is a schematic diagram showing a L1 signaling structure used in a DVB-T2 OFDM frame.

Although illustrated in the context of separate functional elements, some functional elements previously described may be embodied in one, or more, integrated circuits (ICs). Similarly, although shown as separate elements, any or all of the elements (e.g., of FIG. 1) may be implemented in a stored-program-controlled processor, e.g., a digital signal processor, which executes associated software. Further, although illustrated in the context of a DVB system, the principles of the invention are applicable to other types of communications systems, e.g., satellite, Wireless-Fidelity (Wi-Fi), cellular, etc. Indeed, the inventive concept is also applicable to stationary or mobile transmitters and receivers.

Therefore, the foregoing merely illustrates the embodiment of the invention and it will thus be appreciated that those skilled in the art will be able to devise numerous alternative arrangements which, although not explicitly described herein, embody the principles of the invention and are within its spirit and scope.

The invention claimed is:

1. A method for protecting signalling information in a transmission frame that comprises several FEC blocks and is to be transmitted to a receiver in a communication system, the method comprising:
encoding frame signalling information of the transmission frame to protect the frame signalling information; and
encoding FEC block signalling information of said FEC blocks in said transmission frame, to protect the FEC block signalling information, wherein said FEC block signalling information comprises signalling parameters for said FEC blocks so that said FEC block signalling information can change at the FEC level.

2. The method according to claim 1, further comprising transmitting the transmission frame to the receiver, and wherein the encoded FEC block signalling information is followed by FEC data block of the respective FEC blocks.

3. The method according to claim 1, further comprising forming encoded FEC block, each of said encoded FEC blocks including a FEC data block for one of said FEC blocks and the corresponding encoded FEC block signalling information.

4. The method according to claim 1, further comprising transmitting the transmission frame to the receiver, and wherein a repetition signalling information protection is used for the respective FEC block.

5. The method according to claim 1,
wherein the frame signalling information is encoded by concatenation codes with inner codes of DVB-S2-LDPC codes and outer codes of BCH codes.

6. The method according claim 1, wherein the FEC block signalling information includes code rate and modulation for each of the FEC blocks, and wherein the frame signalling information includes selected guard interval for the frame.

7. A transmitter for implementing a method for protecting signalling information in a transmission frame that comprises several FEC blocks and is to be transmitted to a receiver in a communication system, the transmitter comprising:
means for encoding frame signalling information of the transmission frame to protect the frame signalling information; and means for encoding FEC block signalling information of said FEC blocks to protect the FEC block signalling information, wherein said FEC block signalling information comprises signalling parameters for said FEC blocks so that said FEC block signalling information can change at the FEC level;

said transmitter being adapted to implementing the method according claim 1.

8. A method for receiving signalling information in a transmission frame that comprises several encoded FEC blocks from a transmitter in a communication system, the method comprising:

receiving encoded frame signalling information of the transmission frame and encoded FEC block signalling information of encoded FEC block;

decoding the encoded frame signalling information in the transmission frame, and decoding the encoded FEC block signalling information so that a corresponding FEC block is recovered, wherein said FEC block signalling information comprises signalling parameters for said FEC blocks so that said FEC block signalling information can change at the FEC level.

9. The method according to claim 8, wherein the decoded FEC block signalling information of the corresponding FEC block includes a signalling information of another FEC block, and the decoded signalling information for the another FEC block is used to recover a FEC data block of the another FEC block.

10. The method according to claim 9, wherein the another FEC block is an adjacent FEC block to the corresponding FEC block.

11. The method according to any one of claim 8, wherein the FEC block signalling information includes code rate and modulation for each of the FEC blocks, and wherein the frame signalling information includes selected guard interval for the frame.

12. A receiver for receiving signalling information in a transmission frame that comprises several encoded FEC blocks from a transmitter in a communication system, the receiver comprising:

means for receiving encoded frame signalling information and encoded FEC block signalling information of the transmission frame;

means for decoding the encoded frame signalling information in the transmission frame, and means for decoding the encoded FEC block signalling information to recover the corresponding FEC block, wherein said FEC block signalling information comprises signalling parameters for said FEC blocks so that said FEC block signalling information can change at the FEC level;

said receiver being adapted to implementing the method according to claim 8.

13. A transmitter for implementing the method for protecting signalling information in a transmission frame that comprises several FEC blocks and is to be transmitted to a receiver in a communication system, said transmitter being adapted to implementing the method according to claim 1, the transmitter comprising:

An FEC encoder for encoding frame signalling information of the transmission frame to protect the frame signalling information; and for encoding FEC block signalling information of the FEC blocks in the transmission frame, wherein said FEC block signalling information comprises signalling parameters for said FEC blocks so that said FEC block signalling information can change at the FEC level.

14. A receiver for receiving an encoded frame signalling information and encoded FEC block signalling information of a transmission frame that comprises several encoded FEC blocks, from a transmitter in a communication system, said receiver being adapted to implementing the method according to claim 8, the receiver comprising:

a de-mapping device for decoding the encoded frame signalling information in the transmission frame; and an FEC decoder for decoding the encoded FEC block signalling information to recover the corresponding FEC block, wherein said FEC block signalling information comprises signalling parameters for said FEC blocks so that said FEC block signalling information can change at the FEC level.

\* \* \* \* \*